Jan. 17, 1928.
C. A. GUTTIN
1,656,192
SIGNALING DEVICE FOR VEHICLES
Filed July 10, 1926
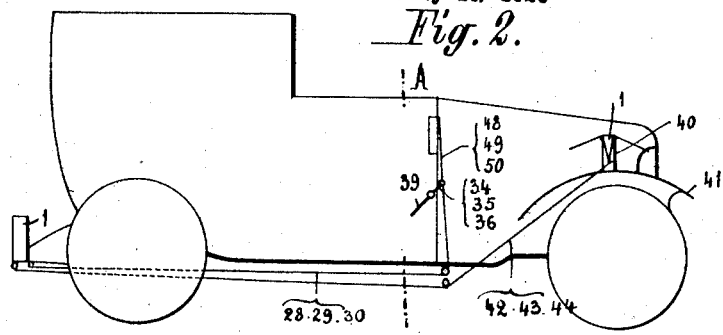
Fig. 2.
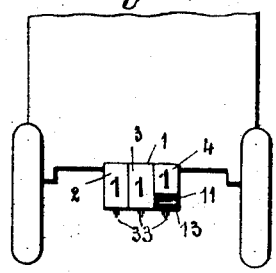
Fig. 1.
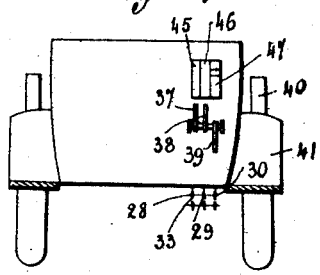
Fig. 3.
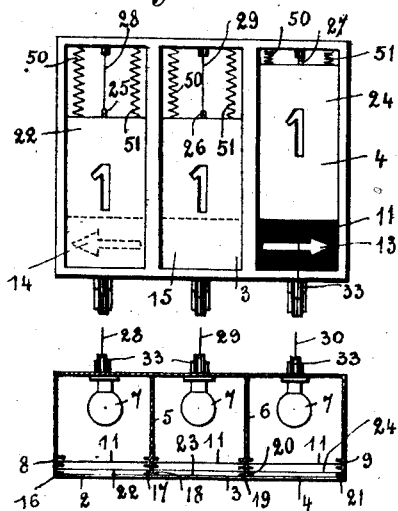
Fig. 4.
Fig. 6.
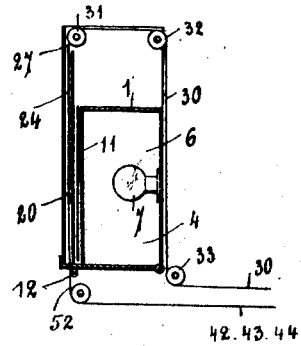
Fig. 5.
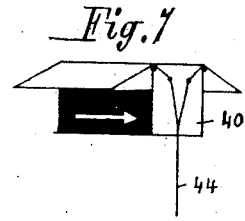
Fig. 7
INVENTOR
C. A. GUTTIN,
BY Jno. Imirie
ATTY.

Patented Jan. 17, 1928.

1,656,192

UNITED STATES PATENT OFFICE.

CHARLES ALFRED GUTTIN, OF L'HAY LES ROSES, FRANCE.

SIGNALING DEVICE FOR VEHICLES.

Application filed July 10, 1926, Serial No. 121,592, and in France July 17, 1925.

My invention relates to a signaling device for vehicles, and chiefly for motor vehicles.

It is characterized by the fact that it is entirely mechanical, and it comprises, in addition to the signal device itself, an indicating element enabling the driver to observe the functioning of the apparatus.

In principle, the apparatus comprises a box mounted in the rear of the vehicle, containing one or more illuminants such as electric lamps; said box may be divided into chambers each corresponding to the standard system of signals. The open rear face of the box is covered with a plate of colored glass and the lower part may carry the usual signal indications, and the upper part the regulation red light in the rear of the vehicle. Before each chamber, and upon the colored glass, is displaced an opaque screen which covers the lower part of the chamber. The upper portion of the screen may be cut out in the shape of letters or signs corresponding to the registered number of the vehicle.

Each of the said screens may be controlled by the driver by means of a cable which is attached to a hook secured to the upper edge of the screen, passing thence over pulleys and attached at the forward end to a handle, pedal or lever within reach of the driver.

Each screen is urged into the lower position by reaction springs or like elastic means, and the screen is further connected at the bottom, by means of a cable passing over pulleys, with the aforesaid indicating device which is placed within sight of the driver.

An analogous signal device, but of double construction may be disposed at the front or at the sides of the vehicle, and the motion of its screens—which are connected together in pairs—is synchronized with the motion of the screens of the rear box by means of cables connected at the forward end with the above-mentioned handles or levers.

I may further connect the screens of this latter apparatus with a second indicating element which is mounted in front of the driver, or at least within sight. Such checking elements may consist of screens whose motion is synchronized with the motion of the screens of the other apparatus, so that by uncovering the proper indications, the proper functioning of the whole arrangement can be verified.

The appended drawings show by way of example an embodiment of the invention.

Fig. 1 shows the rear of a motor vehicle fitted with my signaling device, and Fig. 2 is the corresponding side view.

Fig. 3 is a section on the line A—B of Fig. 2.

Figs. 4 to 6 show various details of a signal box.

Fig. 7 is a perspective view of a front box.

In the example herein represented, each of the signal boxes 1, which consist preferably of sheet metal, is divided into three chambers 2—3—4 by the vertical partitions 5—6, and the box contains one or more illuminants 7. The part of the box which opens to the rear is provided with the grooves 8—9—10 which are adapted to guide and to maintain the red glass plate 11 (for each chamber) which is held when on the road by suitable fastening means 12. The lower part of the glass plate 11 in each chamber 2—3—4 carries a transparent portion for signaling purposes, i. e. the arrows 13 and 14 and the stop signal 15. In front of the glass plates 11 are movable the opaque screens 22—23—24, in the grooves 16—17—18—19—20—21. Each chamber is provided with a screen and the screens may have the registered number of the vehicle cut therethrough so that the number may be conveniently read when observing the screens. Each screen is connected by a respective upper central hook 25—26—27 with respective cables 28—29—30 disposed upon the pulleys 31—32—33 and attached to the respective small arms 34—35—36 of the levers 37—38—39 which are within the driver's reach.

Each of the said screens is downwardly urged by the springs 50—51 whereof one end is attached to the upper edge of the screen and the other end to the inner part of the upper groove of the box. The two lower corners of each screen are connected together by a cord or the like 52 which passes over suitable pulleys and serves to actuate the corresponding screen of the indicating device.

An analogous box 40, but of double construction, is mounted upon the right hand front mudguard of the vehicle, and its opaque screens are connected by the cables 42—43—44 in pairs, and thence to the lower ends of the corresponding levers of the rear screens. The opaque screens 45—46—47 which are placed in view of the driver and are connected as above stated to the corresponding screens of the rear boxes, will serve when the latter are operated, to uncover indicating elements corresponding to the elements which are uncovered on the rear signal boxes.

Obviously, the position of the boxes and the indicating elements may be varied for each vehicle, as well as the number of chambers, the path of the cables, and the controls for said cables, and for instance the double front box may be disposed next the headlight so as to take advantage of the light from this latter which acts by reflection during the night, and the opaque screens might be replaced by swinging flaps.

I claim:

1. In a signal device for vehicles, a casing, illuminating means mounted within said casing, a semi-transparent cover for said casing, a plurality of transparent direction-indicating portions provided on said cover, a plurality of opaque plates mounted within said casing in front of said cover and adapted to slide in said casing, a plurality of cables attached to said plates, a plurality of manually controlled levers for moving said cables and springs for resisting the movement of said plates by said cables.

2. In a device of the character described, the combination of a signal device adapted to be mounted at the rear of a vehicle, a plurality of control levers and cables for operating said signal device, a second set of cables, a secondary indicating means controlled by said second set of cables and connected to the cables of said signal device, said secondary indicating means being adapted to be mounted upon the dashboard of the vehicle, whereby the operator of said signal device may be constantly informed of the condition of said signal device.

3. In a signal of the class described, the combination of a signal device including a plurality of slides to control the visibility of the signals, a plurality of operating devices connected to the slides, a secondary signal to indicate the condition of the slides, signal and connections connected with the operating devices, whereby upon manipulation of the operating devices the secondary signal will indicate the condition of the slides of the first mentioned signal.

4. In a signal, the combination of a casing formed with a plurality of guide-ways, a plurality of slides mounted in the guideways, springs tensioned to force the slides toward the bottom of the casing, opaque portions in the bottom portion of the casing, and at the rear of the slides, each partition having a transparent signal thereon, and a group of operating devices for the plurality of slides, whereby upon manipulation of any one of the group of operating devices, a slide will be raised to expose the signal on the opaque partition in rear of the particular slide elevated, and upon release of said operating device the spring cooperating with the slide will return the latter to normal position.

Signed at Paris in the county of Seine and State of France this twenty ninth day of June A. D. 1926.

CHARLES ALFRED GUTTIN.